Dec. 8, 1931.  H. D. MUNDAY  1,835,513
BRUSH HOLDER DEVICE FOR TRUING COMMUTATORS
Filed May 18, 1928    10 Sheets-Sheet 1
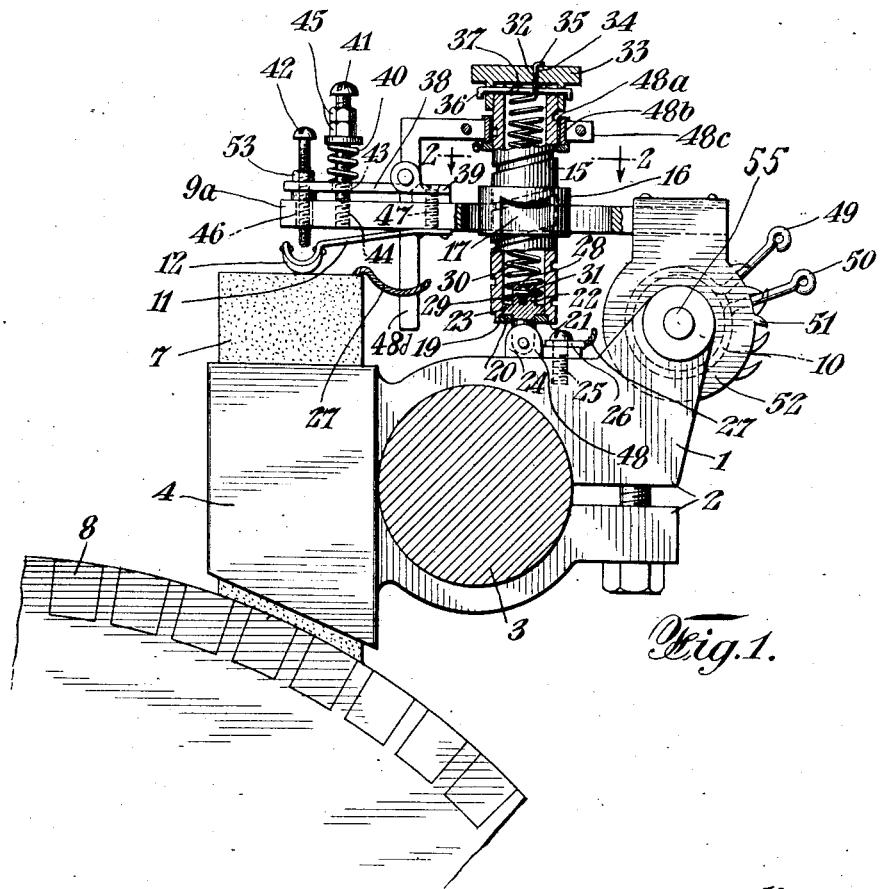
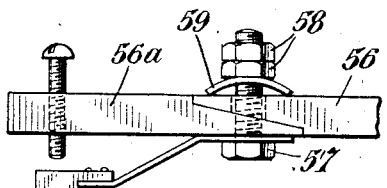
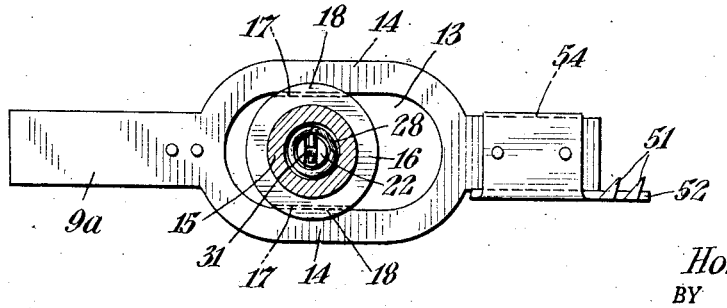
INVENTOR.
Horace D. Munday
BY
Sheldon H. Graves
his ATTORNEY.

Dec. 8, 1931. H. D. MUNDAY 1,835,513
BRUSH HOLDER DEVICE FOR TRUING COMMUTATORS
Filed May 18, 1928 10 Sheets-Sheet 2
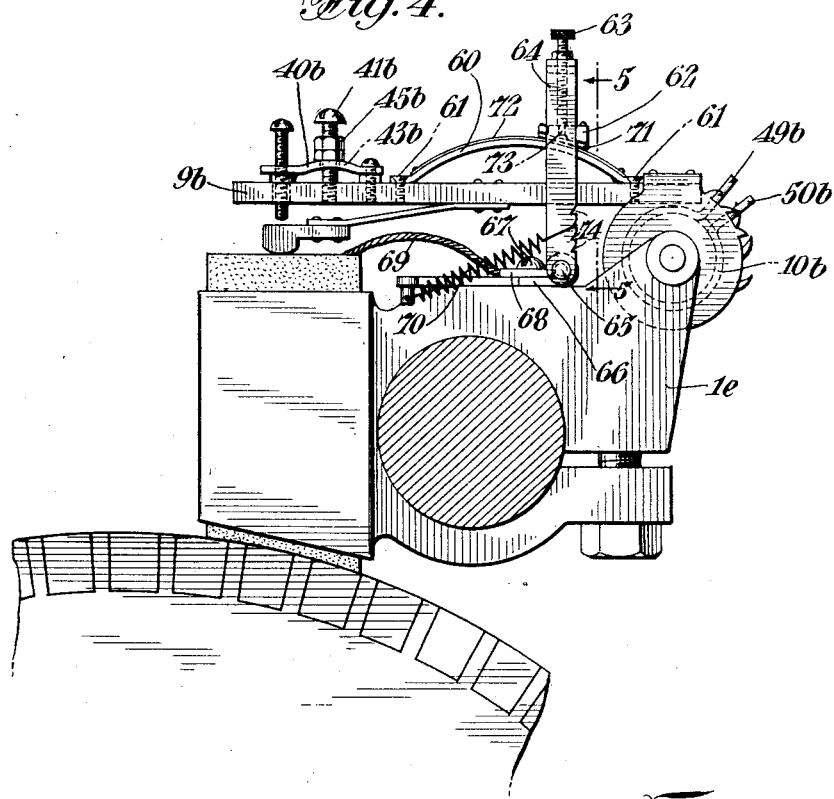
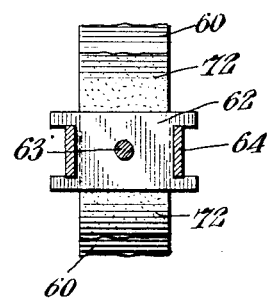
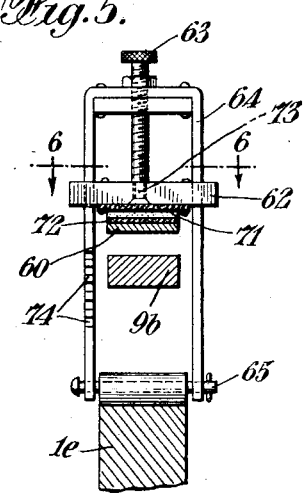
INVENTOR.
Horace D. Munday
BY Sheldon H. Graves
his ATTORNEY.

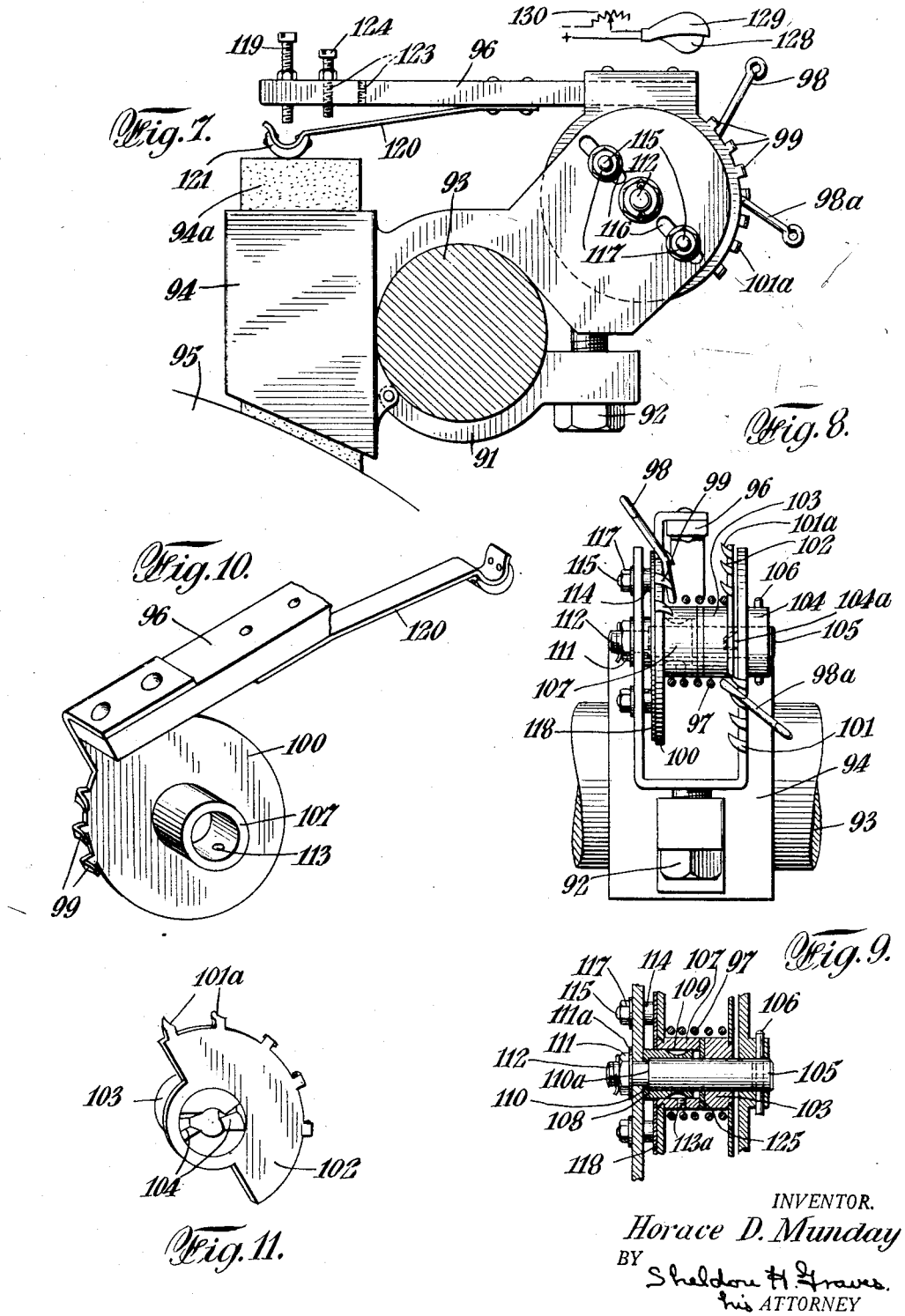

Dec. 8, 1931. H. D. MUNDAY 1,835,513
BRUSH HOLDER DEVICE FOR TRUING COMMUTATORS
Filed May 18, 1928 10 Sheets-Sheet 4
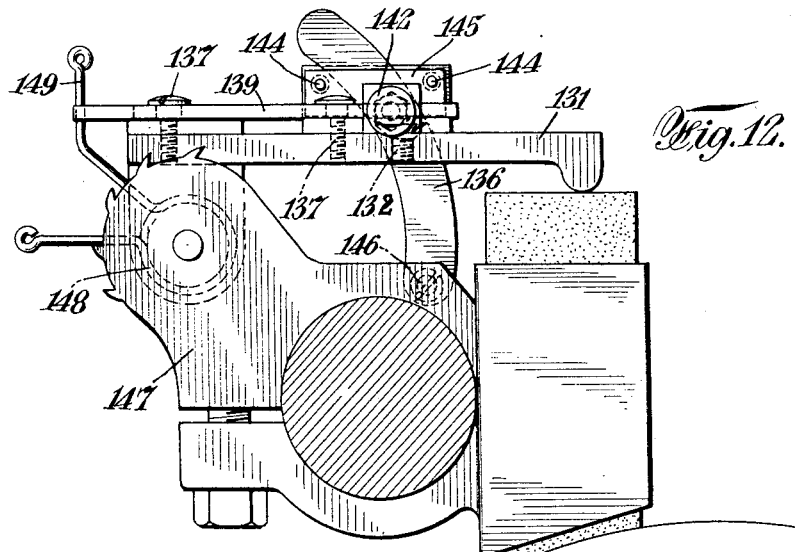
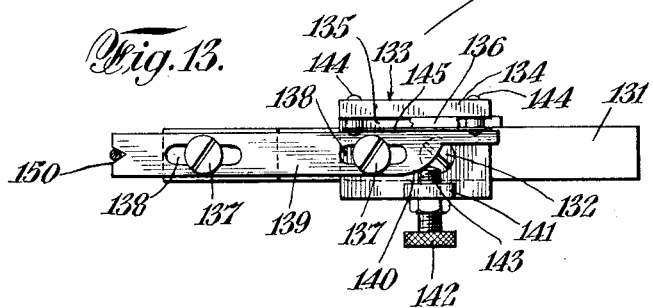
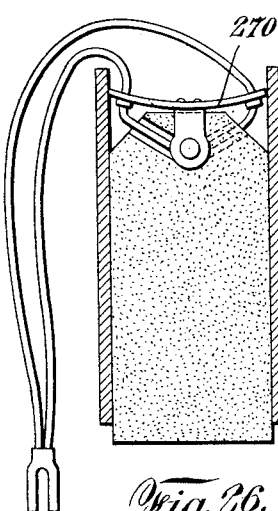
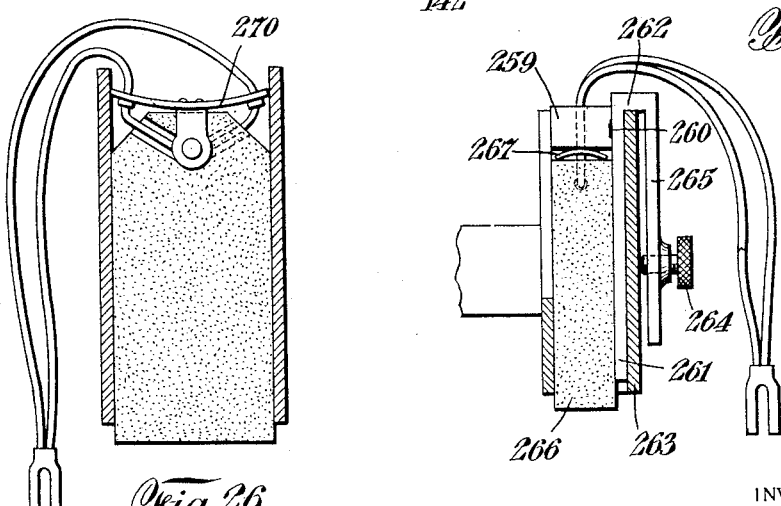
INVENTOR
*Horace D. Munday*
BY
*Sheldon H. Graves*
*his* ATTORNEY

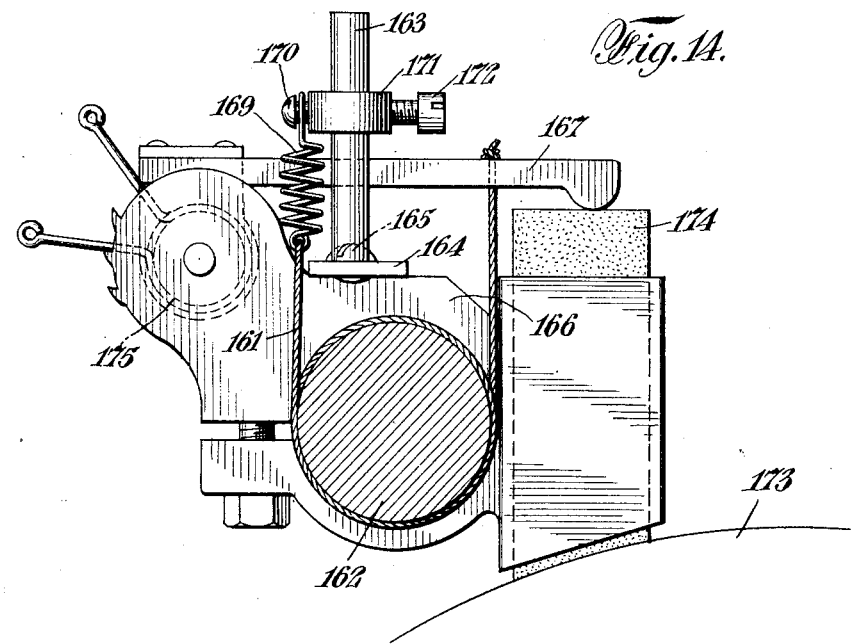
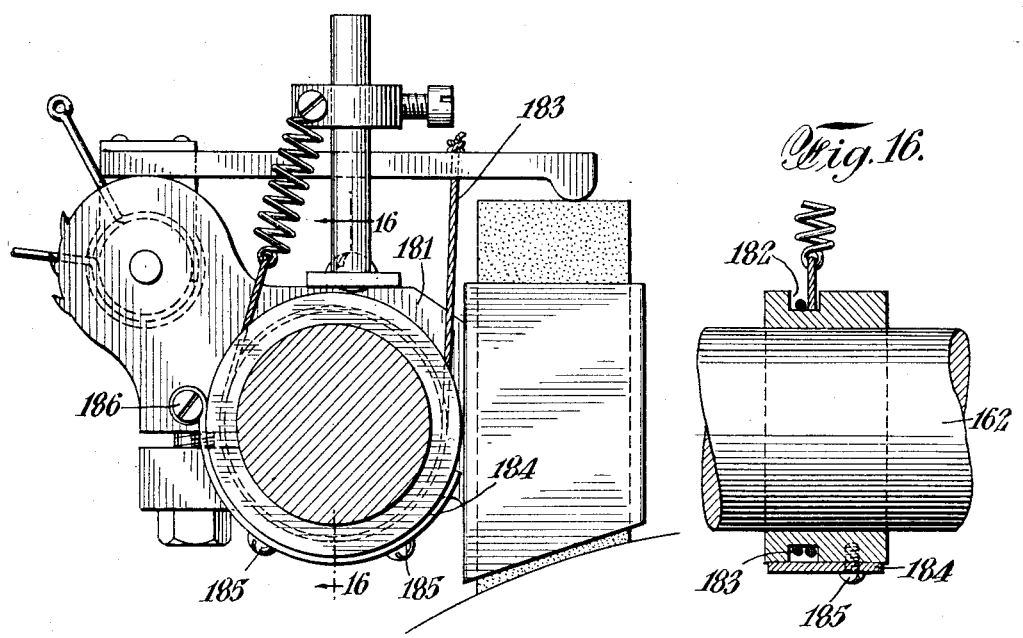

Dec. 8, 1931.      H. D. MUNDAY      1,835,513
BRUSH HOLDER DEVICE FOR TRUING COMMUTATORS
Filed May 18, 1928      10 Sheets-Sheet 6
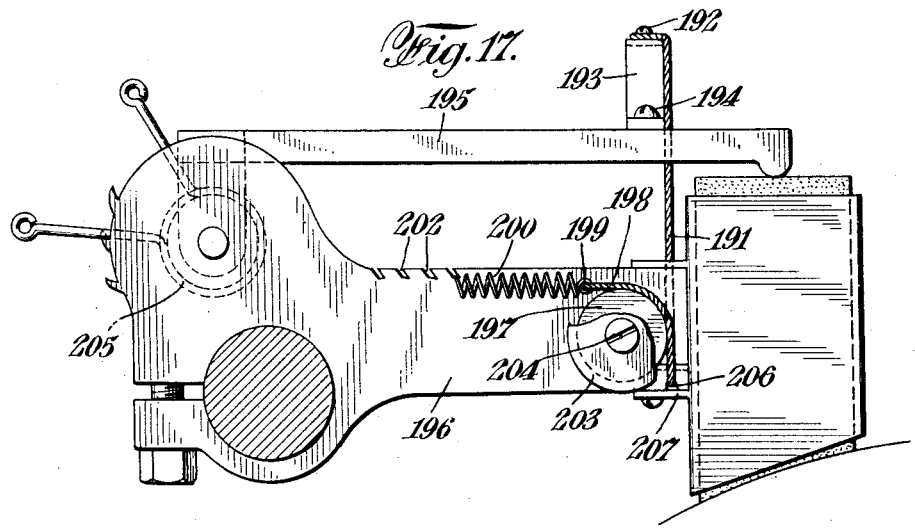
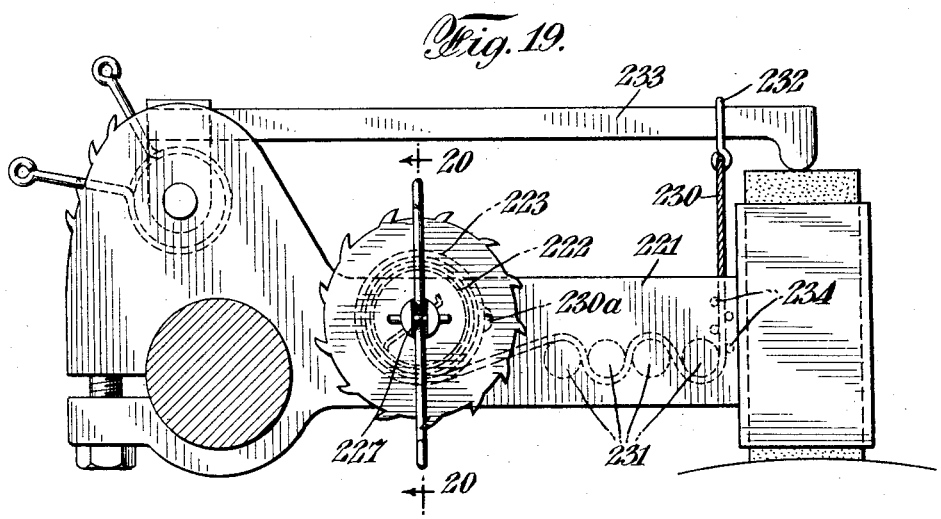
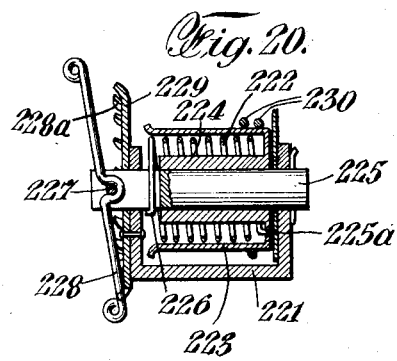
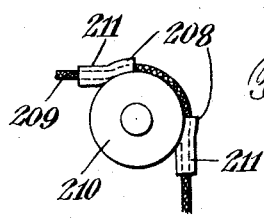
INVENTOR.
Horace D. Munday
BY
Sheldon H. Graves.
his ATTORNEY

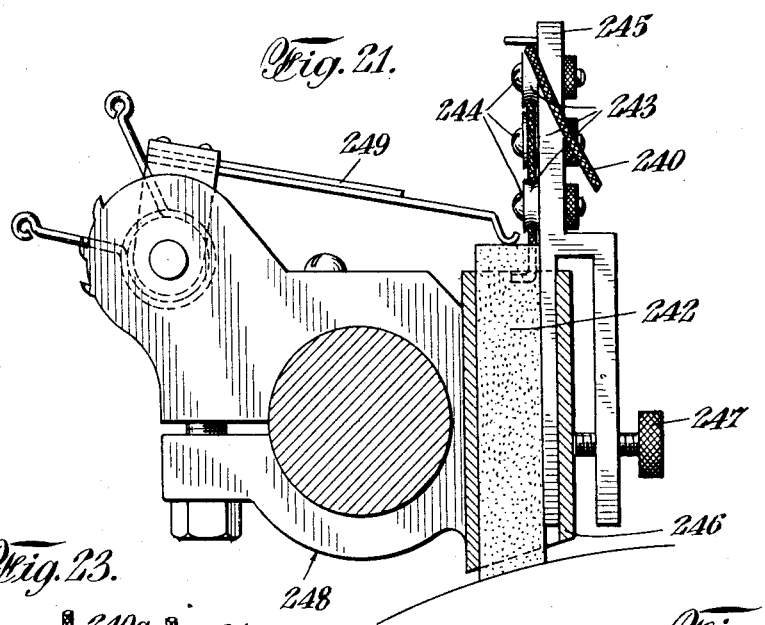
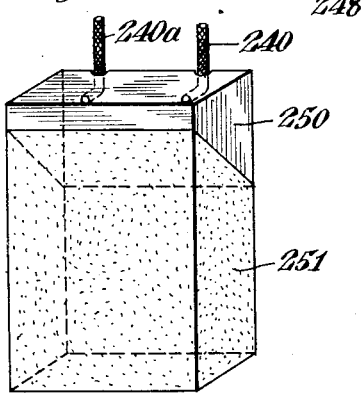
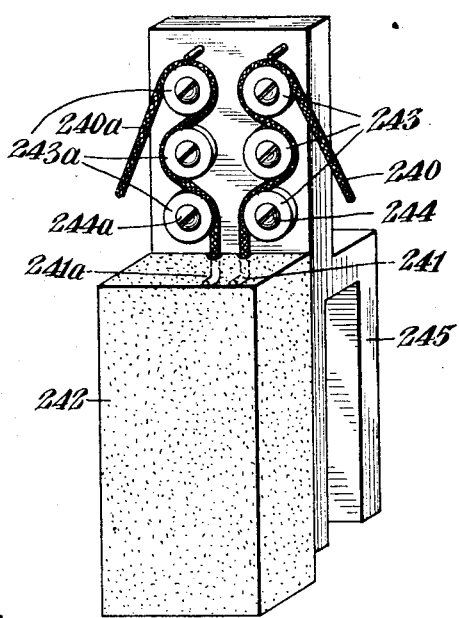
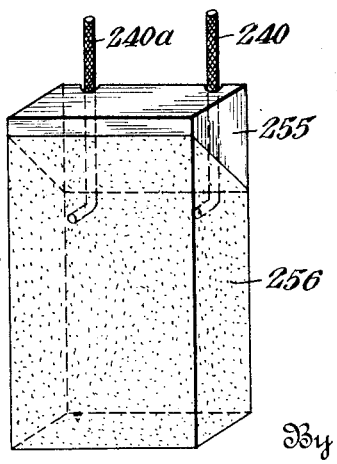

Dec. 8, 1931.  H. D. MUNDAY  1,835,513
BRUSH HOLDER DEVICE FOR TRUING COMMUTATORS
Filed May 18, 1928   10 Sheets-Sheet 8
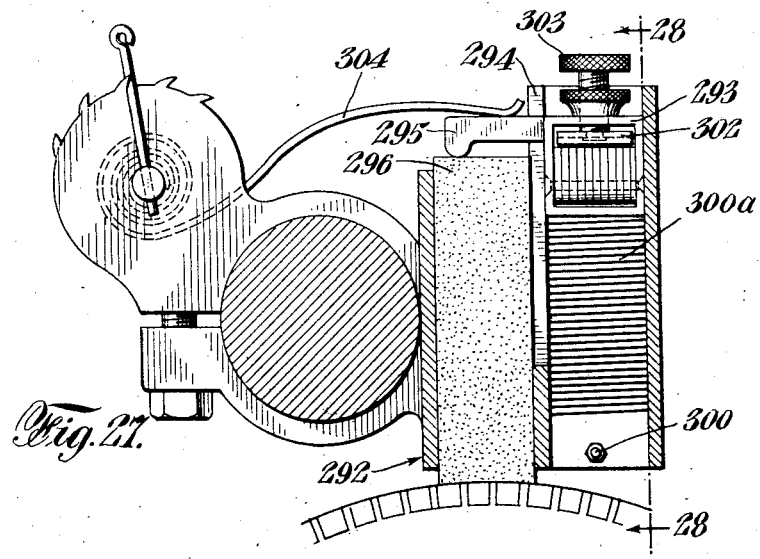
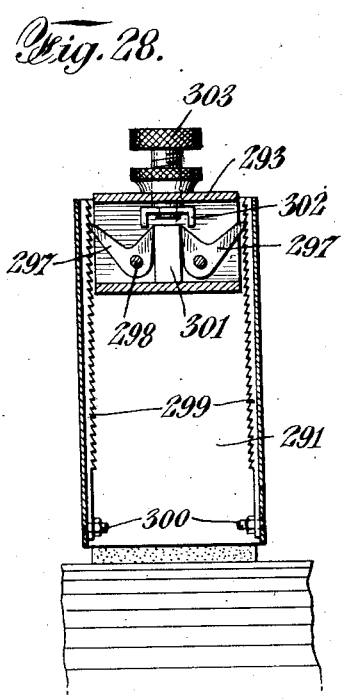
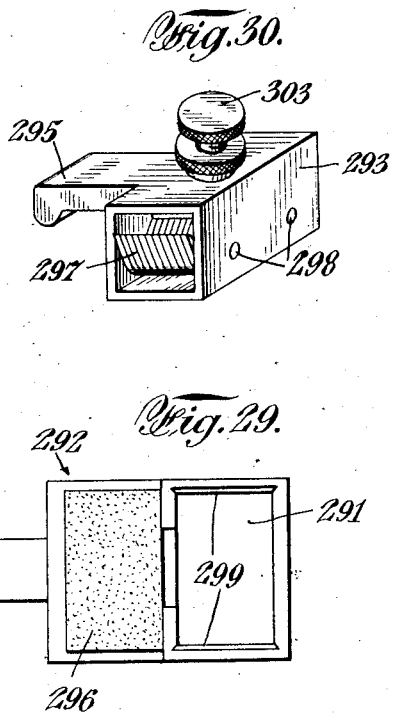
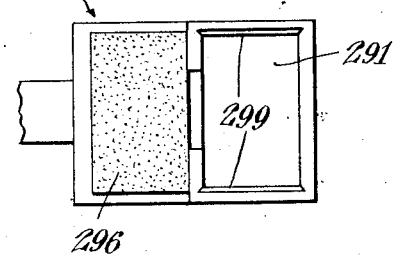
INVENTOR
*Horace D. Munday*
BY
Sheldon H. Graves.
his ATTORNEY.

Dec. 8, 1931.  H. D. MUNDAY  1,835,513
BRUSH HOLDER DEVICE FOR TRUING COMMUTATORS
Filed May 18, 1928  10 Sheets-Sheet 9
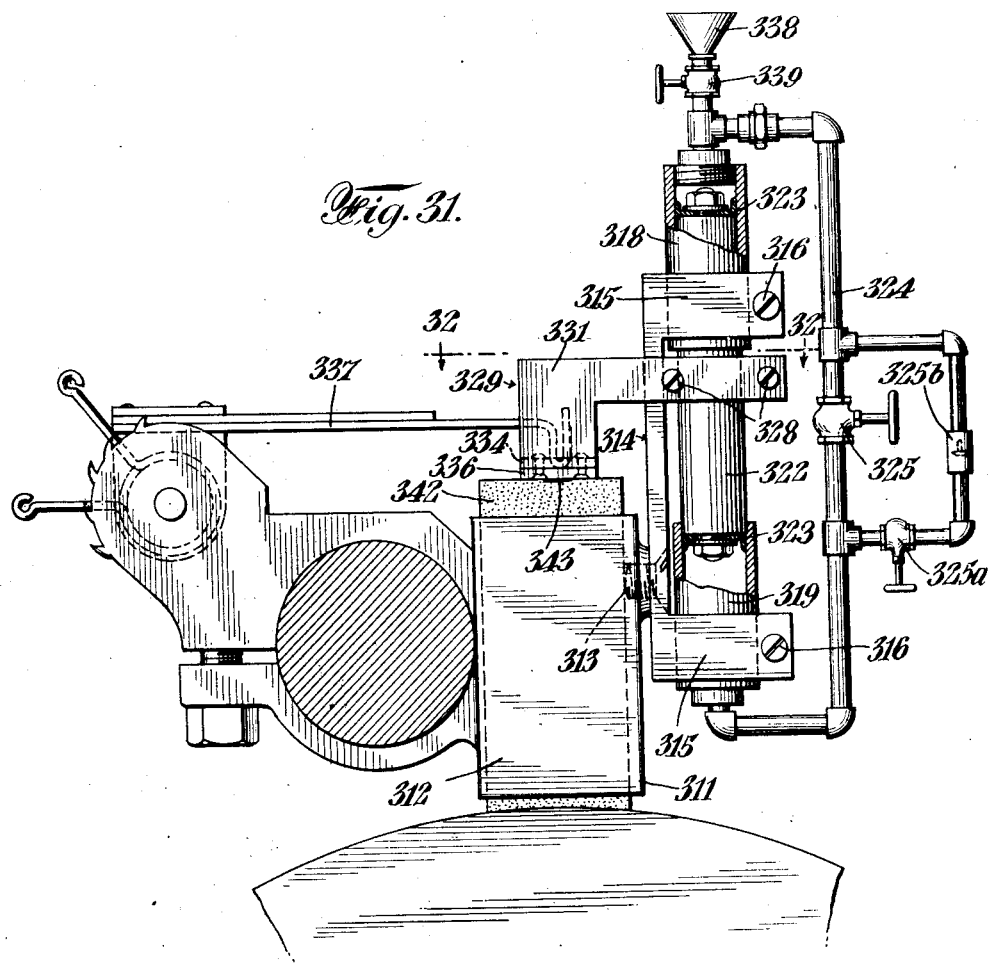
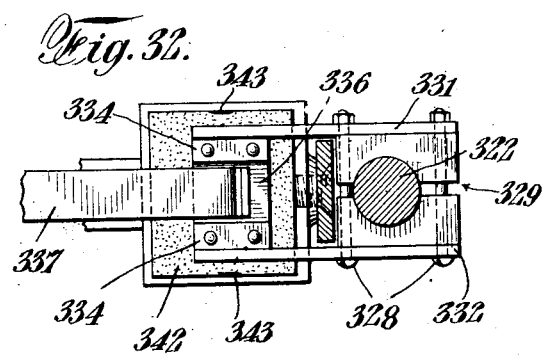
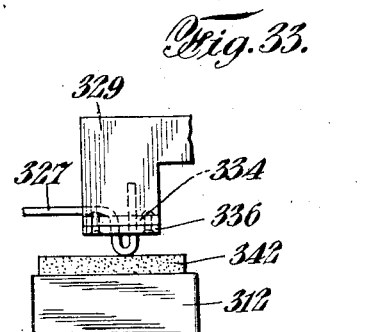
INVENTOR
Horace D. Munday
BY
Sheldon H. Graves.
his ATTORNEY.

Dec. 8, 1931.  H. D. MUNDAY  1,835,513
BRUSH HOLDER DEVICE FOR TRUING COMMUTATORS
Filed May 18, 1928   10 Sheets-Sheet 10
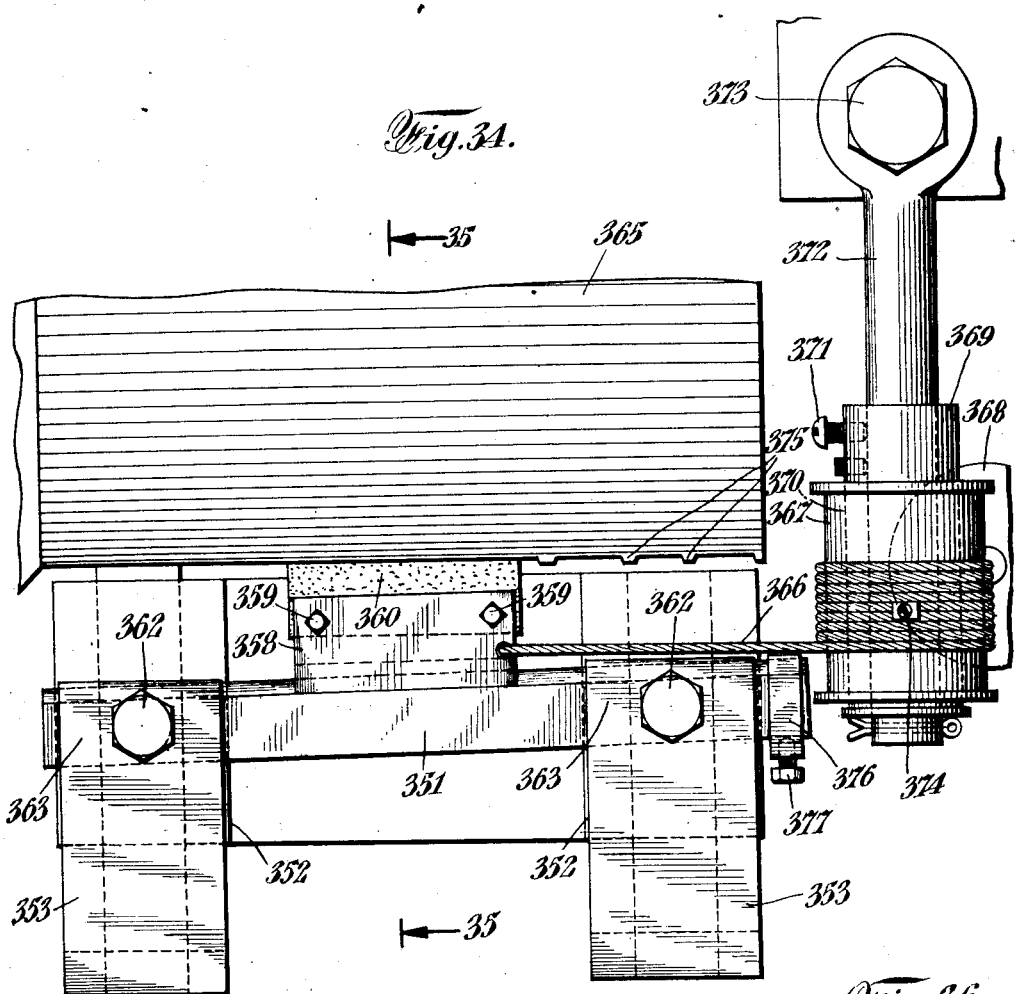
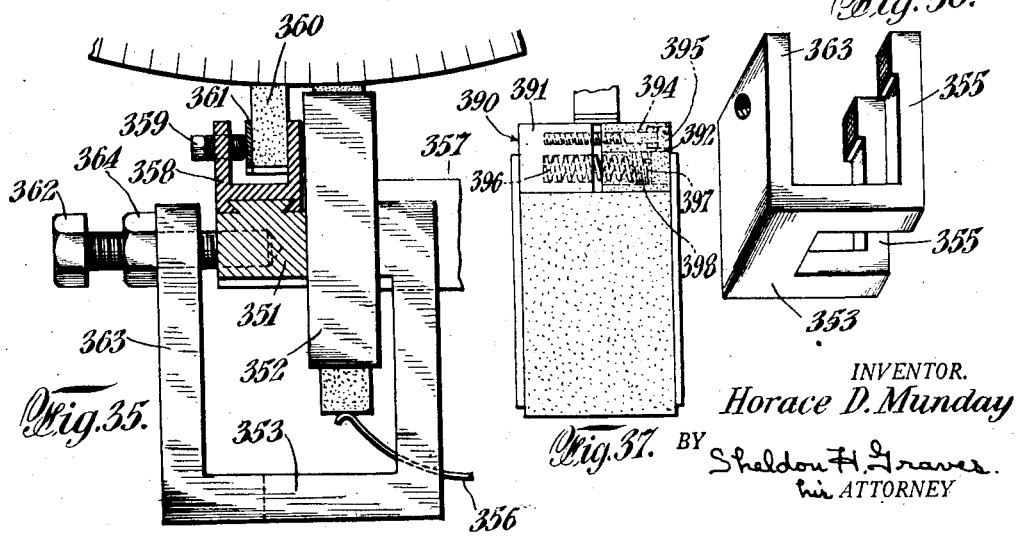
INVENTOR.
Horace D. Munday
BY Sheldon H. Graves.
his ATTORNEY Patented Dec. 8, 1931

1,835,513

UNITED STATES PATENT OFFICE

HORACE D. MUNDAY, OF SCHENECTADY, NEW YORK

BRUSH HOLDER DEVICE FOR TRUING COMMUTATORS

Application filed May 18, 1928. Serial No. 278,750.

This invention relates to current collectors and particularly to brush holders adapted for use with commutators or slip rings.

One object of my invention is to provide a brush holder adapted for use with an abrasive member or with an abrasive brush wherein the parts are so arranged as to cause the member or brush to exert a truing effect on the commutator of the machine with which it is used.

A further object of the invention is to provide an improved brush holder adapted for use with an abrasive member or an abrasive brush and which will cause the member or brush to exert a truing effect on the commutator of the machine with which it is used. A further object of my invention is to provide a brush holder with means for advancing or feeding the brush toward the commutator and preventing or resisting any backward motion of the brush. A further object of the invention is to provide a brush holder adapted for use on a machine which is subject to heavy vibration and wherein the wear on the moving parts of the brush holder is reduced to a minimum. A further object of my invention is to lessen the rebound of brushes on high speed electric machines, which rebound is apt to occur when slight irregularities exist in the commutator surface.

Sooner or later, from one cause or another, flat spots develop in many commutators and slip rings. An abrasive cloth and abrasive stones applied by hand are the expedients that are generally tried first to keep the machines in proper working condition. This treatment is generally unsatisfactory and the commutator continues to get worse until finally the machine has to be shut down and the commutator trued by other methods. Small armatures are generally taken out of their frames and the commutators trued in a lathe. The commutators of large machines are some times trued in place by a portable grinding or turning device. This operation is apt to consume several days during which the machine is out of commission. Undercutting of the mica in the commutator is one remedy tried for these obvious disadvantages. On small commutators undercutting of the mica is not satisfactory because the slots formed in the commutator by the undercutting are apt to fill up with dirt and burn out the armature.

In employing the devices constructed in accordance with the present invention, I overcome the disadvantages just noted. The operation of such devices is automatic and does not require the constant attention of the operator. Furthermore it does not or need not interfere with the normal operation of the machine.

The abrasive or active member employed for truing the commutator may be a block formed of pure abrasive and adapted to be employed in a brush holder of the machine or otherwise associated with a brush holder, or the active member may contain conducting material in addition to abrasive material, and such member may function not only as the active truing element but also as one of the brushes of the machine.

In the preferred embodiments of my invention, means is provided for advancing the abrasive or active member toward the commutator and also for hindering the motion of the abrasive, that is, retarding or preventing motion of the abrasive toward or away from the commutator.

One effect of a hindering means employed by me is to prevent the abrasive from advancing quickly into a low spot of the commutator as the low spot passes under the abrasive and to confine the rubbing of the abrasive to the high spots of the commutator. Or in case the abrasive does enter the low spot of the commutator the hindering means will offer a high resistance to the backward or retrograde motion of the abrasive as the abrasive is being pushed back by the commutator surface onto the high spot. In either of these cases the abrasive will be pressed less against or toward the low spots of commutator than against other portions of the commutator surface, with the result that ultimately the commutator will be ground to a true cylindrical or round surface.

The hindering means which I employ may be frictional or it may consist of a viscous substance such as asphalt interposed between a stationary and movable part of the apparatus. Also, optionally, a sluggishly yielding metal such as lead or solder, may be employed. In certain cases, to provide a hindering of the backward or retrograde movement of the abrasive I may make use of the high resistance offered by a comparatively rigid grinding apparatus when the apparatus is caused to yield structurally a slight amount by the forcing backward of the abrasive by the high spot of the commutator. The weight of the grinding apparatus may contribute materially to this effect and, if desired, the apparatus may be weighted to increase its inertia.

The means of hindering the motion of the abrasive forms an important feature of the invention, together with the fact that the force for moving the abrasive is such that the advancement of the abrasive, radially at least, is harmlessly haltable on contact with the commutator.

With a viscous substance interposed to hinder the advancement of the abrasive towards the commutator, permitting the abrasive to move forward only slowly towards the commutator, the abrasive will slowly advance till it strikes the high parts of the revolving commutator. Since the speed of the commutator is so great in comparison with the slow speed of the abrasive that the abrasive is not able to feed forward into the low spots of the commutator while the commutator is making one revolution, it is evident that the low spots of the commutator will not be touched till all the high spots have been worn down. Consequently the commutator must necessarily become true.

In the use of friction hindering means for truing up a commutator there is the difference that in the case of friction both the high part and the low part of the commutator are worn down at the same time—the high part being worn down heavily and the low part lightly. In the case of the viscous substance hindering means, as has been seen, the low part of the commutator is not touched at all till the high part has been worn down completely. How friction can be used to true up a commutator can be seen from the fact that the net force causing the advancement of the abrasive is only the excess of the spring or weight over the friction hindering means. On the other hand the total force necessary to cause a retrograde movement of the abrasive is equal to the sum of the friction and the force of the spring or weight. Consequently the reaction pressure of the commutator on the abrasive will be much greater when the abrasive is being shoved backward from the commutator than when the abrasive is merely stopped in its advancement towards the commutator. After the high level part of the commutator comes under the abrasive and the abrasive necessarily ceases any further retrograde movement, the slight spring in the apparatus and its supports as a whole may be made to cause the abrasive to continue to exert the maximum pressure on the level high part of the commutator. Consequently since the abrasive exerts a heavy pressure on the high part of the commutator and a light pressure on the low part of the commutator, the commutator will finally become true.

Some of the metals or alloys have the property of yielding or bending slowly when subjected to a certain pressure. Lead is such a metal: solder is another. This property can be used in a number of ways to give a slow motion. For instance, a belt of lead or solder on pulleys will permit only a slow motion of the pulleys when the proper driving force is applied.

While in a preferred form of the invention the means used for hindering the motion of the abrasive are friction hindering means and viscous substance hindering means, sluggishly yielding metal and in certain cases relief springs, structural yield, inertia clock mechanism and an oil or other fluid pump may form the hindering means. Other motion-hindering means are available, such as the means used now or in the past to regulate the movement of time-measuring mechanism. These means include the balance-wheel as disclosed in Figure 1 of my patent Number 1,727,112, a piston and cylinder, slow motion of the piston being caused by water or oil being allowed to slowly leave the cylinder or to slowly enter the cylinder.

Other objects and advantages of my invention will appear from the following description taken in connection with the accompanying drawings wherein:

Figure 1 is a side view, partly in section, of a brush holder embodying the preferred form of my invention;

Figure 2 is a detail sectional view taken on the line 2—2 of Figure 1;

Figure 3 is a detail view showing a modification of the snubbing device shown in Figure 1.

Figure 4 is a view similar to Figure 1 but showing a modified form of the invention.

Figure 5 is a detail sectional view taken on the line 5—5 of Figure 4.

Figure 6 is a detail sectional view taken on the line 6—6 of Figure 5;

Figure 7 is a view similar to Figure 1 but showing a further modification;

Figure 8 is a rear end elevation of the brush holder shown in Figure 7;

Figure 9 is a fragmentary sectional view of the structure shown in Figure 8, the direction of view being the same as that of Figure 8;

Figure 10 is a perspective view of the pressure finger shown in Figure 7 and parts integral therewith, including the pressure finger disc hub and auxiliary spring;

Figure 11 is a perspective view of part of the construction shown in Figures 7 and 8, this part being employed to cause friction on the pressure finger;

Figure 12 is a side view of another modification;

Figure 13 is a detail plan view of a portion of the structure shown in Figure 12;

Figure 14 is a side view of another modification wherein a cord or wire is employed for retarding the motion of the pressure finger;

Figure 15 is a view similar to Figure 14 but showing a modification;

Figure 16 is a sectional view taken on the line 16—16 of Figure 15;

Figure 17 is a view similar to Figure 15 but showing a further modification;

Figure 18 is a detail view showing a modification of the structure shown in Figure 17;

Figure 19 is a side view showing a still further modification;

Figure 20 is a sectional view taken on the line 20—20 of Figure 19;

Figure 21 is a side elevation, partly in section, showing a further modification;

Figure 22 is a perspective view of a part of the structure shown in Figure 21;

Figure 23 is a detail perspective view showing a modification of the structure shown in Figure 22;

Figure 24 is a view similar to Figure 23 but showing a still further modification;

Figure 25 is a side or edge elevation, partly in section, showing a further modification;

Figure 26 shows a further modification;

Figure 27 is a side elevation of another modification showing means for positively advancing the brush toward the commutator;

Figure 28 is a sectional view on the line 28—28 of Figure 27;

Figure 29 is a plan view of the structure shown in Figure 27;

Figure 30 is a perspective view of part of the structure shown in Figure 27;

Figure 31 is a side view, partly in section, of another modification in which the slow escape of fluid is used to give delayed action to the brush or active member;

Figure 32 is a fragmentary plan view partly in section on the line 32—32 of Figure 31;

Figure 33 is a detail view of an alternative construction;

Figure 34 is a side elevation of a further modification wherein means is provided for moving an abrasive block axially of the commutator;

Figure 35 is an end view, partly in section, of the structure shown in Figure 34;

Figure 36 is a perspective view of a part of the structure shown in Figures 34 and 35, and Figure 37 is a side or end elevation showing a further modification.

In the form of my invention shown in Figures 1 and 2, a brush holder frame 1 is secured by a clamp 2 to the stationary stud 3 of an electric machine. The brush holder frame 1 is formed with a brush holder box 4 through which the brush 7 is adapted to be fed to contact with the commutator 8. Reference character 9a represents a brush pressure finger which is adapted to be actuated by a spring 10 to advance the brush through the brush holder box 4; the pressure finger 9a transmitting its movement to the brush through the auxiliary spring 11 and brush engaging tip 12.

Through an elongated hole or opening 13 rimmed by the sides 14 of an enlarged portion of the pressure finger 9a, passes a tube 15 which is externally threaded for engagement with a nut 16. Nut 16 is sufficiently reduced at opposite sides of its lower part 17 to enter the elongated opening 13 in the pressure finger; shoulder 18 of the nut bearing on the sides 14 of the pressure finger. The bore of the tube 15 is slightly enlarged at its lower end 19 to permit a collar 20 to be secured therein by peening over the lower edges 21 of the tube. A short rod 22 formed with a flange 23 intermediate its ends extends into the tube 15 and is pivoted at its lower end in brackets 24 secured to the brush holder frame 1 by screw 25; screw 25 serving an additional function of securing the terminal 26 of the brush pigtail 27. The upper end of rod 22 is slotted at 28 to receive and secure the lower end 29 of spiral spring 30, said lower end being suitably bent to enter the slot 28. Pin 31 serves to secure the lower end of the spring 30 to the rod 22.

The upper end 32 of the spiral spring 30 is made secure to the tension adjusting cap 33, preferably by bending the end of the spring at right angles to enter the hole 34 in the cap 33 and bending over the upper end of the spring at 35 to hold the cap in place. The axial tension of the spring 30 holds the cap snugly against the tube 15.

By turning the tension-adjusting cap 33 in a clock-wise direction as viewed from the top, the tension of the spring 30 is increased there being provided a pin 36, adapted to enter slanting slots 37 in the rim of tube 15, to secure the tension adjusting cap in any desired position.

It is evident that the threaded tube 15 will tend to revolve under the action of spring 30 in a counter clock-wise direction, always keeping the nut 16 pressed closely against the pressure finger 9a the nut 16 being kept from turning by the reduced or squared portion which engages the sides of the elongated opening 13. Consequently, all forward motion of the pressure finger 9a is held by engagement of the pressure finger with the nut 16.

At the outer end of the pressure finger 9a is a brush snubber bar 38 hinged to the member 39 secured to the pressure finger by a screw 47. A snubber tension screw 41 passes freely through an opening 43 in the movable snubber bar 38 and is threaded into the pressure finger 9a at 44. A snubber relief spring 40 surrounds the screw 41; bearing at its lower and upper ends respectively against the snubber bar 38 and the tension adjusting nut 45. An auxiliary spring limit screw 42 is threaded into the outer end of the snubber bar 38 and is securely held in said bar by jam-nut 53. Screw 42 passes freely through the hole 46 in the pressure finger 9a and is adapted to be adjusted as desired so to limit the bending or flexing of the auxiliary spring 11. By completely compressing the spring 40, by adujstment of the nuts 45, and by advancing the screw 42 to the brush engaging tip 12, the auxiliary spring 11 is thrown out of action.

The purpose of the hinged member consisting of the tube 15 and the parts carried thereby is to permit a swinging motion of the tube 15 so that as the pressure finger is advanced the tube will always remain substantially perpendicular to the pressure finger.

The brush holder thus far described, in addition to the function of holding the usual brush and maintaining the brush in proper contact with the commutator, is adapted to perform a number of other useful functions. Suppose that the commutator has a flat spot in it which it is desired to grind out. An abrasive brush or an abrasive block is placed in the brush-holder box 4. The auxiliary spring limit screw 42 is advanced into contact with the brush-engaging tip 12 of the auxiliary spring 11. Pressure is then put on the pressure finger in the usual way, that is, by placing the arm 49 of the actuating spring 10 in one of the notches 51 of the pressure finger disc 52 and the arm 50 in a stationary notch. Tension is then put on the spiral spring 30 by turning the tension adjusting cap 33 clockwise, thus causing the threaded tube 15 to rotate and advance the nut 16 to hold all advancement made by the pressure finger 9a. Instead of using the spring 10 to advance the pressure finger it may be left out of action altogether, dependence being had upon the nut 16 to advance the pressure finger as well as to hold all advancement made.

Under the combined action of the spring 10 and the spring 30, or spring 30 alone if spring 10 is left out of action it is evident that the brush or abrasive block will advance till it comes into contact with the commutator at the flat spot. How hard the contact with the commutator at the flat spot will be depends on the stress of the springs 10 and 30, or the spring 30 alone if spring 10 is not used. With comparatively light tension of the springs, the contact of the brush with the commutator at the flat spot will be light, and therefore the wear of the flat spot of the commutator will be slight. When the high part of the commutator comes under the brush and the brush is forced backwards the snubber relief spring 40 will be compressed. As this snubber relief spring is short and relatively stiff, the high spot of the commutator will have to exert considerable pressure on the brush before it is forced backwards. Consequently there will be considerably more wear of the high spot of the commutator than of the flat spot with the result that the commutator will finally become true.

Where the commutator is not badly out of round dependence can be made on the lack of structural rigidity of the brush holder and supporting parts which may permit sufficient yielding as the high spot of the commutator comes under the brush to prevent the brush from being broken. Under the reaction pressure of the brush as the high spot of the commutator comes under it, the yielding of the auxiliary spring 11 being annulled, the pressure finger will yield a little, the brush-holder frame will yield a little, the brush-holder stud will yield a little and the brush-holder yoke will yield a little, all taken together amounting to some thousandths of an inch. These various elements which are not designed for flexibility and are considered inflexible strength elements, will yield slightly under the reaction thrust of a high part of the commutator, so as to permit the passing of the high part under the brush and at the same time cause the brush to exert a relatively heavy pressure on the high part. As means is also provided for advancing the brush as needed, this arrangement becomes an automatic truing device which does not require attention of an attendant.

The auxiliary spring limit screw 42, whether disposed as in Figure 1 or threaded into the end of the pressure finger 9a may, in certain cases be omitted, provided the auxiliary spring 11 is brought forcibly up against the under side of the pressure finger 9a by strongly tensioning the spring 10 and spring 30 or by tensioning the spring 30 alone if spring 10 is not used. In this manner the force applied to the pressure finger, tending to advance or swing it downwardly, is sufficient to cause a complete compression of the auxiliary spring 11. With this adjustment the brush 7 will be pressed more heavily into contact with the commutator than when spring 11 is allowed to function and as a result there will be somewhat more wear on the low spots of the commutator during the truing operation. However in certain cases where it is desirable that the brush advance quickly into low spots of the commutator rather than sluggishly, this adjustment, wherein the auxiliary spring is completely compressed, is of decided advantage.

In the operation of the device with the adjustment made as shown in Figure 1, that is, with the auxiliary spring 10 partially compressed and free to move in either direction, there is little if any truing effect on the commutator. This is because the difference in pressure exerted by the auxiliary spring in a position corresponding to that wherein the brush is in contact with a low spot of the commutator and the pressure exerted in another position a few thousandths of an inch away corresponding to that in which the brush is in contact with a high spot of the commutator, is not great enough to cause any substantial difference of wear between the low spot and high spot.

The brush holder thus far described is particularly designed to operate without excessive wear on the bore of the pressure finger hub 54 and the pin 55, particularly when the brush holder is employed merely as such and not as a truing device. When used as a simple brush holder the pressure finger 9a is actuated as above described and auxiliary spring limit screw 42 is backed off to permit free play of the auxiliary spring 11. Under these conditions instead of continual vibration or swiveling movement of the pressure finger 9a, whatever vibration occurs will be taken up to a large extent by the spring 11 thus saving the pin 55 and the bore of the hub 54 from wear. This feature is of particular advantage when the brush holder is mounted on a machine which is subject to heavy vibration.

The brush holder may also be used to check a rebound of the brushes on high speed machines, caused for example, by irregularities in the commutator surface. When used for this purpose the pressure finger 9a is actuated as before described. The auxiliary spring limit screw 42 is then advanced nearly to contact with the brush engaging tip 12 of the auxiliary spring 11. With this adjustment any more than a slight backward movement of the brush will be stopped by the end of the auxiliary spring limit screw 42. Further backward movement of the brush will require compression of the snubber spring 40 which can be made as stiff as desired by adjustment of the nut 45.

In Figure 3 is shown a modification of the snubbing device of Figure 1, wherein the pressure finger is formed of an inner part 56 and an outer part 56a secured to the inner part by means of a bolt 57, the connection between these parts constituting, in effect, a hinge. Nuts 58 partially compressing the comparatively stiff spring 59 serve to hold the two parts 56 and 56a in stiff integral relation until a predetermined reaction brush pressure has been exceeded when the part 56a yields slightly as the spring 59 flexes.

When a block of pure abrasive is used to true the commutator or when the conducting brush employed for truing the commutator has a high abrasive content, it may be desirable to have the abrasive member hurdle the low spot of the commutator so as to practically eliminate all wearing contact between the abrasive and the low spot. For this purpose I provide a means which will prevent a sudden advance of the brush into the low spot of the commutator as the low spot passes under the active face of the brush. Such a means is shown in Figure 1 wherein reference character 48a represents a short tube which surrounds the threaded tube 15 and is attached thereto near its upper end, a short grooved tube 48b telescoping tube 48a. Between the tube 48b and 48a is a film of asphalt or other sluggishly yielding material which adheres to the outer surface of tube 48a and the inner surface of tube 48b. Clamping the short tube 48b in the groove is a strap 48c, the outer end of which is formed with a downwardly projecting part 48d. The downwardly projecting part 48d is adapted to engage the side of the pressure finger 9a to prevent rotation of the strap 48c under the influence of the spring 30. It will be then seen that with the strap 48c clamped in the manner shown that the pressure finger 9a which can advance under the influence of spring 30 only by rotation of the tube 15 will advance but slowly because the rotation of the tube 15 is hindered by the sluggishly yielding asphalt. It will be understood that in employing the device in this manner spring 10 will be disconnected and reliance will be had for advancing the pressure finger entirely on the spring 30. When the asphalt hindering effect is not needed the strap 48c is loosened or removed.

It is obvious that, by increasing the pitch of the threads on tube 15, the pressure finger 9a, instead of being held positively against backward movement, will be retarded or hindered in its backward movement.

In the modification shown in Figures 4, 5 and 6, the means for positively advancing or holding the advancement or retarding the backward movement of the pressure finger comprises a cam 60 attached to the pressure finger 9b by screws 61. A cross head cam follower 62, adapted to slide frictionally on the cam 60, is mounted in the stirrup guide 64 and is vertically adjustable in the guide 64 by means of a screw 63. Guide 64 swings on a pin 65, held by the eyed strap 66 secured to the brush holder frame 1c by the screw 67, which screw also serves to secure the terminal 68 of the brush pig-tail 69. The spiral spring 70 which is secured at one end to the stirrup 64 and at the other end to the brush holder frame normally pulls the stirrup guide 64, tending to rotate it in a counter clock-wise direction and keeps the cross-head cam follower 62 always in close contact with the cam 60. The cross-head cam follower 62 is preferably formed with a leather facing 71 for the purpose of increasing the friction between the cam and the follower. When there is no leather or other frictional surface forming the contact between the cam and the cam follower such contact consisting of metal sliding on metal, the angle between the legs of the stirrup guide and a normal to the surface of the cam, at the point of contact of the cam and the cam follower, should not be greater than about 15 degrees if it is desired to prevent all retrograde movement of the brush. This condition determines the form of the cam. With a friction surface such as leather, on the cam or on the cam follower or on both, this angle can be considerably increased. In fact the angle can be nearly as large as what is known as the "angle of repose", that is, the angle whose tangent is the coefficient of friction; or greater than the angle of repose if non-positive advancement of pressure-finger is desired.

The cam follower adjusting screw 63 is swiveled to the cam follower 62 as by peening over the reduced lower end 73 of the screw, the screw 63 being threaded as shown into the upper end of the stirrup guide 64. The purpose of the cam follower adjusting screw 63 is to vary the position of the cam follower 62 in the stirrup guide 64 in order to vary the position of the cam 60 and therefore the position of the pressure finger 9b to conform to a full length brush or partially worn brush.

The snubber relief spring consists of a flat piece of spring steel 40b apertured at 43b to bodily or slidably receive the snubber tension screw 41b threaded at its lower end into the pressure finger 9b. The tension of the snubber relief spring 40b is adjustable by nuts 45b.

In using the brush holder in the modification shown in Figures 4 to 6 the pressure finger 9b is placed under tension by adjustment of the actuating spring arms 49b or 50b in the usual way, the pull of spring 70, which is adjustable by placing the upper end of the spring in one or another of the notches 74, is adjusted to cause the cam follower to follow up in close contact with the cam 60. If desired, however, the spring 10b need not be used, dependence being had on the spring 70 to advance the pressure finger, as well as to hold all advancement made.

The operation of this form of invention is easily understood. The brush is advanced by pressure of the finger 9b acting under the influence of the spring 70 or the combined influence of spring 70 and spring 10b. Backward movement of the brush in a direction away from the commutator is prevented or strongly resisted by engagement of the cam on the pressure finger with the follower on the swinging stirrup guide 64.

The brush holder shown in Figures 7 to 11 includes some means as the clamp 91 and the cap screw 92 of attachment to some stationary part of the machine as the brush-holder stud 93. A brush-holder box 94 serves to direct the advancement of the brush 94a towards the commutator 95, the thrust of the pressure finger 96 impelling the brush towards the commutator, said pressure finger being pivotally mounted on the stationary part of the brush holder and actuated by the spring 97, the arm 98 of the spring 97 exerting a thrust against the notch 99 of the disc 100 riveted to the pressure finger 96. The reaction thrust of the other arm 98a of the spring 97 may be exerted either on the fixed notches 101 or on the notches 101a which fringe the rim of the semi disc 102 integral with the hub 103 with the cams 104 on its end, said cams 104 nesting with the complementary fixed cams 104a. The hub 103, and consequently the semi disc 102 and the notches 101a, has a slight rotary movement on the pivot 105 held stationary by the cotter pin 106 extending through a slot in the head of pivot 105. The hub 107, integral with the pressure finger disc 100, rotates on the same geometric axis as the hub 103, but between the bore of hub 107 and pivot 105 is interposed a bushing 108 with groove 109 and an internal shoulder at 110, said shoulder 110 butting against the corresponding shoulder 110a of the pivot 105 when the nut 111 threaded on the reduced end 112 of pivot 105 is tightened. 111a is a lock washer. The hole 113 serves for filling the clearance space or groove 109 between the bushing 108 and the bore of hub 107 with melted asphalt or other viscous substance, the hole 113 then being plugged with screw 113a. The axial thrust of the pressure finger disc 100 is taken by the heads 114 of the small bolts 115, which are radially adjustable in the slots 116 by loosening the nuts 117. Between the pressure finger disc 100 and the screw heads 114 is interposed the thin fibre disc 118. The fibre disc is to prevent any cutting by one metal rubbing on another. It may be replaced by fibre caps on the screw heads 114, or omitted if desired. The bodies of the screws 115 are preferably squared to fit the width of the slots 116 so that they will not turn when a wrench is applied to the nuts 117. The adjustment of the screw 119 serves to limit the movement of the pressure finger auxiliary spring 120. When the screw 119 is advanced till the end strikes the bottom of the spring bow or hammer 121 in its undeflected position then the auxiliary spring 120 is put completely out of action. Near the end of the pressure finger 96 are several threaded holes 123, in either of which the screw 124 may be placed. By this arrangement the stiffness of the auxiliary spring 120 may be varied in effect. By advancing screw 124 till the end comes into contact with the spring 120, the spring is practically made stiffer. If the screw 124 does not quite touch the spring 120, the spring will move comparatively easily on a backward thrust of the brush till the spring comes into contact with the screw 124; thereafter the spring will yield stiffly till it comes into contact with the end of screw 119. Any further backward motion of the brush beyond this point requires the movement of the pressure finger. By this means varied and progressive degrees of resistance to the rebound of the brush on high speed machines can be secured.

A fibre washer 125 receives the thrust of hub 103 and transmits it to hub 107.

For modifying the viscosity of the asphalt hindering means thermal means, such as the electric lamp 128, may be used. Heat received from the lamp may be varied by its position or by the variable interposition of a screen, such as the shade 129, or by current control, as by the rheostat 130.

The operation of this brush holder for various purposes will now be described.

When it is desired to have this brush holder function in a manner similar to the type of brush holder in common use, the nut 111 is loosened and the arm 98a of the actuating spring 97 is placed in one of the notches 101. Since the nut 111 is loosened the bushing 108 is free to turn on the pivot 105, as the asphalt or other viscous substance between bushing 108 and the hub 107 of the pressure finger disc causes the bushing and the hub to turn as a unit. Since the arm 98a now impinges against the fixed notches 101 and not against the notches 101a of the slightly rotatable semi disc 102 integral with the cam hub 103, this hub 103 will exert no axial thrust on the pressure finger hub 107 which is integral with pressure finger disc 100, and so there will be no friction produced on the disc 100 by the bolt heads 114.

Suppose now that it is desired to use the brush holder to true up a commutator with flat spots in it and yet have the brush follow up the flat spots of the commutator not breaking contact with the commutator at the flat spots as would be the case if the flat spots were hurdled. In this case the screw 119 is advanced till the end comes into contact with the bottom of the bow hammer 121 of the auxiliary spring 120, thus annulling the action of the auxiliary spring. The arm 98a of the actuating spring is then placed in one of the notches 101a. This slightly rotates the hub 103, the cams 104 on its end coming into contact with the fixed cams 104a, the fixed cams 104a then giving an axial thrust to the hub 103, which impinges on the hub 107 via washer 125, hub 107 in turn causing the pressure finger disc 100 to rub against the bolt heads 114, thus causing enough friction to substantially hinder the movement of the pressure finger 96. The friction prevents the full force of the actuating spring 97 being delivered to the end of the pressure finger that makes contact with the brush. Consequently, when the brush is moving forwards, as is the case when it is moving into a flat spot of the commutator, there will be a comparatively small pressure exerted by the brush on the commutator, and, consequently comparatively small wear by the brush on the flat spots of the commutator. But when the pressure finger 96 is moving backwards conditions are reversed, friction in this case aiding the spring 97 to resist the backward motion of the pressure finger. Now when the brush is moving backwards is the time when the high spot of the commutator is coming under the brush. Consequently there will be a comparatively large pressure between the brush and the high spot of the commutator, and consequently, a comparatively large wear by the brush on the high spot of the commutator. Naturally, with comparatively little wear on the low spot of the commutator and comparatively much wear on the high spot of the commutator, there is a tendency for the commutator to become true. If the brushes are sufficiently abrasive the commutator will become true.

If it is desired that the brush wear only on the high spot of the commutator, thus hurdling the low spot, the nut 111 is tightened, clamping the bushing 108 to the pivot 105. As the clearance space between the bushing 108 and the bore of the hub 107 is filled with asphalt or some other viscous substance, it is clear that the hub 107, as well as the disc 100 and the pressure finger 96 integral with it, cannot move except as the asphalt yields. Now the asphalt yields so slowly compared with the speed of the electric machine that the pressure finger is not able to advance the brush into contact with the commutator when the low spot of the commutator comes under the brush. Consequently there will be no wear by the brush on the low spot of the commutator, all the wear by the brush coming on the high spot of the commutator. As a result the commutator will finally become true. The arm 98a is assumed to be in notches 101a in the above described operation.

By removing the arm 98a from notches 101a to notches 101, the friction of the screw heads 114 on the pressure finger disc 100 will be eliminated, the asphalt alone then acting as the hindering means to hinder the motion of the pressure finger 96. However, the use of asphalt alone as the hindering agent is less advantageous sometimes than the use of both asphalt and friction as the hindering agent.

Suppose now there is considerable vibration in the machine and in the brush holder mounted thereon, and consequently the possibility of considerable wear on the pressure finger hub and the pivot on which it rotates. It is desired that the continual movement of the pressure finger relative to the stationary part of the brush holder be eliminated so as to avoid the wear between the hub and pivot. In this case the spring arm 98a is placed on the notches 101a, thus throwing into action the friction hindering means; the viscous substances hindering means optionally may or may not be used by tightening or loosening the nut 111. The screw 119 is backed off so as to give free movement to the auxiliary spring 120. Under these conditions there will be little movement between the pivot and the hub of the pressure finger, and consequently very little wear, most of the vibration being made by the auxiliary spring 120 instead of by the pressure finger. By disposition of screw 124 in one of the holes 123 and adjustment of screw 124, the rebound of the brush can be regulated.

Suppose now the brush holder is mounted on a high-speed machine with slight irregularities in the commutator that causes a strong rebound of the brushes. In this case the spring arm 98a is placed in notch 101a, thus throwing the friction hindering means into action. Then, the brush being in position in the brush holder, the screw 119 is advanced till the end nearly touches the bottom of the bow hammer 121 of the auxiliary spring 120. It will be seen that a slight rebound of the brush can take place before the bow 121 of the auxiliary spring 120 comes into contact with the end of the screw 119. From this point on the further rebound of the brush is strongly resisted by the spring 97 and the friction hindering means as well. The viscous substances hindering means may optionally be used or not used by tightening or loosening the nut 111.

Mention has been made of the fact that the friction bolts 115 are radially adjustable in the radial slots 116. The distance apart of the bolts 115 determines the ratio between the friction torque and the torque produced by the actuating spring 97. This ratio becomes greater as the distance between the screws 115 becomes greater. They should in no case be placed so far apart that the friction becomes large enough to prevent the pressure finger from moving forward at all.

The active faces of the cams 104 and 104a should preferably be short sections of square screw threads.

In the modification shown in Figures 12 and 13 another method is used for frictionally hindering the motion of the pressure finger 131. Secured by the screw 132 to the top of the pressure finger 131 is the U-shaped clamping box 133. The inner width of this clamping box is a little greater than the width of the pressure finger 131. In the bottom of this U-shaped box and near the side 134 is a slot 135 of a size to slidingly receive the segmental friction strip 136. Slidably mounted by means of the screws 137 and the slots 138 above the pressure finger 131 is the gripping bar 139. The end of this gripping bar that lies near the segmental gripping strip is given a curved form 140. Mounted in the side 141 of the U-shaped clamping box is the thumb-screw 142 in position for its point 143 to coact with the curved end 140 and thrust it towards the segmental friction strip 136. Spacedly secured by rivets 144 to the side 134 of the clamping box and disposed between the curved end 140 of the gripping bar 139 and the segmental friction strip 136 is a thin strip of flexible metal 145, such as spring steel or phosphor bronze. This metal strip is flexible enough to freely transmit the lateral thrust of the curved end 140 of the gripping bar to the segmental friction strip 136. The segmental friction strip 136 is attached by the screw 146 to the brush holder shank 147. The thrust of the actuating spring 148 is transmitted by the spring arm 149 to the end of the gripping bar 139 at the notch 150. It is evident that the axial thrust received by the gripping bar at the end 150 will be divided at the other end into an axial thrust and a lateral thrust. The relative proportion of these two thrusts will depend on the position of the thumb-screw 142. If the thumb-screw 142 is far advanced, the axial thrust will predominate over the lateral thrust; if the thumb-screw is little advanced, the lateral thrust will predominate over the axial thrust. At some intermediate position of the thumb-screw 142 the friction on the segmental friction strip 136 will not be quite large enough to stop the movement of the pressure finger 131. This position of the thumb-screw 142 will generally be the best position for truing up a commutator. The reason for the use of the flexible metal strip 145 is to avoid the possibility of a variable friction, due to the possible looseness of mounting of the gripping bar 139.

In the modification shown in Figure 14 the friction hindering means is applied in the form of a flexible element 161, such as a stranded wire cord or thin metal ribbon wrapped around or partly around the brush holder stud 162. The attachment is made to a brush holder of a type in common use without any mutilation of the brush holder, by using the screw that holds the brush pigtail to secure the attachment to the brush-holder shank.

A vertical rod 163 is riveted to the foot or plate 164, which is secured by the screw 165 to the brush-holder shank 166. To the pressure finger 167 is secured one end of a stranded steel wire or thin phosphor bronze metal ribbon 161, said flexible wire extending under and half around the brush-holder stud 162 to the spring 169, to which this end of the wire is secured. The other end of the spring 169 is secured by the screw 170 to the collar 171 slidably mounted on the rod 163 and adjustable thereon by means of the screw 172. When used to true up the commutator 173 an abrasive brush or abrasive block 174 is preferably substituted for the usual brush. The pressure finger actuating spring 175 may or may not be used when a commutator is being trued up. If the pressure finger actuating spring 175 is not used, the abrasive brush or abrasive block being advanced by the use of the spring 169 only and the coefficient of friction assumed to be 20%, then, with the wire cord covering 180 degrees of circumference, pressure exerted by a high spot of the commutator to force the brush backwards will be about 3½ times the pressure exerted by the flat spot of the commutator to stop the advancement of the brush towards the commutator. This ratio is sufficiently large to true up a commutator. If the stranded wire covers three-quarters of the circumference of the brush-holder stud 162, this ratio will rise to 6½.

A similar arrangement may of course be used on the other side of the brush-holder shank.

The modification shown in Figures 15 and 16 uses the same principle used in the modification of Figure 14. In the modification shown in Figures 15 and 16 the central portion of the shank 181 is widened into a grooved hub 182 in which is disposed the turn or bight of the stranded wire 183. To protect the wire 183 from a flash-over a shield 184 surrounds a considerable portion of the wire. This shield is attached by the screws 185 and 186 to the brush-holder shank 181.

In the modification shown in Figure 17 one end of a stranded wire cord 191 is attached by the screw 192 to one end of an offset bracket 193 secured by the screw 194 to the brush-holder pressure finger 195. The said stranded wire cord then runs under the rounded end of the brush-holder shank 196 and over the cylindrical stub 197 projecting from the side of the brush-holder shank 196, the end 198 being attached to hook 199 in the end of the spiral spring 200, said spring being tensionally adjustable by looping the eye in the other end of said spring over the notches 202 in the edge of the brush-holder shank 196. The washer 203 secured by the screw 204 serves to keep the stranded wire 191 in position.

The amount of friction exerted by the stranded wire 191 can be easily figured out by assuming certain conditions. The said wire 191 covers 180° of circumference on the brush-holder shank and 90° of circumference on the cylindrical stub, or a total of 270° of circumference. With a coefficient of friction of 25%, it will take, say, three pounds at one end of the wire 191 to overcome one pound at the other end. A pull of 6 pounds by the spring will give approximately a 2 pound pull at the other end. To overcome a pull of 6 pounds by the spring 200 it will however require a pull of 18 pounds at the other end of the wire. Consequently the pressure exerted by the high spot of the commutator to shove the brush backwards in comparison to the pressure exerted by the flat spot of the commutator to stop the advance of the brush will be substantially in the ratio of 18 to 2, or 9. This ratio is on the assumption that the pressure finger spring 205 is not in action. If this spring 205 should be in action and exert a pressure of, say 1 pound near the wire 191, this ratio will be reduced to 19 to 3, or about 6. By giving a turn of the wire 191 around the cylindrical stub 197, 360° of circumferential contact are added to the previous 270°; to overcome a pull of 6 pounds exerted by the spring 200 would require a pull of 90 pounds at the other end of the wire 191 under these conditions. It is evident that no hindrance whatever is made by the wire 191 to the forward motion of the pressure finger. The wire 191 runs in a groove 206 extending down the rear side of the brush-holder shank and under it. This groove is kept covered by the metal strip 207. One of the purposes of the metal strip 207 is to prevent that portion of the wire adjacent to the rear side of the brush-holder shank from taking a bow form when unwound from the rounded portion of the brush-holder shank 196.

If the strands of the wire cord 191 are not very fine the wire may take a permanent set because of being bent around the rounded portion of the brush-holder shank. This permanent flexure results in what is the equivalent of lost motion. Such lost motion effect due to the permanent set of the wire taking a bow form can be avoided by having grooved guides tangential to the cylindrical portions of its path. This is shown diagrammatically in Figure 18 in which the grooved or tubular guides 208 prevent the tangential portions 209 of the wire taking a bow form when unwound from the cylinder 210. With the proper reverse crooks in these tubes as indicated at 211, the effect of the bow not only may be avoided, but the bow itself removed.

It is evident that a thin metal ribbon or fibre cord might be used in place of the stranded wire cord 191. Or a small light metal chain might be used instead of the stranded wire. With the chain or fibre cord there would be no bow effect to be taken care of. The objection to the fibre is on account of a slight yielding inherent in such material.

In the modification shown in Figures 19 and 20 the brush-holder shank 221 is in trough or channel form. Within this hollow shank is mounted the spring 222 housed in the cylindrical shell 223, the hub 224 of which makes a bearing fit on the shaft 225. One end 225a of the enclosed spring 222 is hooked into the end wall of the cylindrical shell 223, and the spring's other end 226, diametrically bent, is inserted in the slot 227 in the end of the shaft 225. The spring 222 is put under stress by inserting the arm 228, secured in slot 227 to the shaft 225, in the notches 228a that fringe the rim of the sheet metal disc 229 riveted to the side of the brush-holder shank 221. One end of the stranded wire cord 230 is secured at 230a to the cylindrical shell 223 on which is wound a turn or two of the wire cord 230, which thence leads optionally around one or more of the friction pins 231 spanning the space between the sides of the brush-holder shank 221, and then to the hook 232, which is hooked over the pressure finger 233 when it is desired to have the brush advance positively. When the brush holder is used in the usual way the hook 232 is removed from the pressure finger 233. Straightening pins 234 serve to straighten the wire 230 or prevent a bow in the portion between the said straightening pins and the hook 232. On a backward motion of the brush a bow in this portion of the wire would first have to be straightened out before the backward motion of the brush could be effectively checked, if the bow were not removed by straightening pins or made ineffective by said pins or by a tube or groove.

Still another principle may be utilized in a hindering means. Certain metals or alloys, such as lead or solder, have the property, when subjected to a force less than that necessary to immediately bend or distort them of bending or yielding, but only slowly. This principle may be used in hindering the motion of the pressure finger of the brush holder or abrasive by fastening wire solder to the pressure finger or abrasive, the body of the wire being drawn by the pull of the pressure finger or abrasive in a wave form to the left and right of alternate pins or rollers arranged in a row.

In the modification shown in Figures 21 and 22 two pieces of wire solder 240 and 240a are used as the hindering means. The two solder wires have their ends 241 and 241a bent at right angles and inserted in holes in the outer end of the abrasive 242. The wire solder 240 then passes alternately to the left and right of a plurality of grooved rollers 243; and the wire solder 240a passes alternately to the right and left of a plurality of grooved rollers 243a. The pins 244 and 244a on which these rollers turn are attached to the stemmed U-shaped supporting member 245, this member straddling the front wall 246 of the brush-holder box to which it is fastened by the thumb-screw 247. The perspective view in Figure 22 shows the assemblage of the abrasive 242, the wire solder hindering means and the stemmed U-shaped supporting member 245 before attachment to the brush holder 248.

In operation the pressure finger 249 exerts pressure on the abrasive 242. The abrasive is prevented from a quick advancement by the solder wires which are wrapped around or sinuously engage the rollers. However, the wires bend, though slowly, the rollers slowly revolve and the abrasive makes corresponding advancement to contact with the commutator at the high spots of the commutator. The speed of advancement of the abrasive towards the commutator may be varied by changing the number of rollers around which the wire solder is wrapped, the fewer the number of rollers the faster the solder wire advances. If the stress on the actuating spring of the pressure finger is increased or decreased the abrasive advances faster or slower.

It is evident that if the pins 244 and 244a around which the rollers revolve were covered with asphalt the motion of the rollers would be retarded and the speed of advancement of the abrasive consequently decreased. It is evident that if, instead of a solder wire, a flexible wire or cord had one end made fast to one of the rollers and a turn or two of the wire taken around the roller, the other end being secured to the abrasive, the abrasive will be hindered in its advancement towards the commutator. The pin around which the roller revolves is preferably made rotatably or translatably adjustable for the purpose of taking up any possible slack in the wire or cord when initial adjustment is being made.

Instead of the solder wires being attached to the abrasive as shown in Figures 21 and 22 they may be attached to a wedge-shaped pushed member 250 in Figure 23, said pusher member being designed to receive the thrust of the pressure finger and transmit the thrust to the abrasive. In this case delay hindering means cooperates with friction hindering means. In Figure 24 the solder wires are not connected to the pusher 255 but pass by it or through it to connection with the abrasive 256. The wedges shown in Figures 23 and 24 and wedges of a similar character are made the subject matter of a separate application Serial Number 278,751 of even filing date herewith.

In the modification shown in Figure 25 the pusher member 259 is square, thus avoiding friction hindering means. The hindering effect is secured by a bit of asphalt 260 placed between the side of the pusher member 259, and the inside limb 261 of the U-shaped protective member 262, the two limbs of which straddle the front face of the brush-holder box 263, being secured thereto by the thumb-screw 264 threaded into the outer limb 265 of the U-shaped protective member 262.

In order to make the brush 266 follow up into the flat spots of the commutator there is interposed between the upper end of the brush 266 and the pusher member 259 the thin phosphor bronze trough-shaped spring 267. This spring is relatively weak, that is, in comparison with the strength of the spring actuating the brush-holder pressure finger, so that this spring 267 is easily completely flattened out by a retrograde motion of the brush 266 when a high spot of the commutator comes under the end of the brush. The purpose of this spring is to cause the brush to follow up into the flat spots of the commutator. When it is desired that the brush 266 should hurdle the flat spots this spring can be removed or otherwise put out of action.

In the modification shown in Figure 26 a flat spring 270 is riveted to the brush rest that receives the thrust of the pressure finger. This spring engages the walls of the brush-holder box and hinders the motion of the brush, hindering a retrograde movement more than a forward movement. If the spring is made sufficiently short a retrograde movement of the brush may be prevented altogether.

In the modification shown in Figures 27 to 30 there is a box or guide 291 in front of and integrally united to the usual brush-holder box 292. In this box is slidably mounted the pawl holder or housing 293. The common wall 294 is slotted for half or more of its length to allow the auxiliary finger 295 to project through into the brush-holder box to engage the brush 296. In either end of the pawl holder 292 is a series of pawls 297 swiveling on a common pin 298. These pawls engage hardened teeth formed in thin steel or case-hardened strips 299 secured to two opposite walls of the second box or guide 291 by dovetailing them in and by the use of the small bolts 300. The pawls 297 have a general L-shape and are all of the same size; the teeth 300a of the hardened strips 299 are slightly out of normalcy with respect to the length of the steel strips so that the pawls engage the teeth, not all at the same time, but one after the other. The slope of the teeth should be such that the pawls successively come into engagement with the teeth in regular order. The purpose of the plurality of pawls is to make the steps shorter than would be the case if there were only one pawl; with 50 teeth to the inch there would have to be an advancement of the brush or of the abrasive of 20 mils before a retrograde movement would be checked in a new place; with ten pawls successively coming into engagement with the teeth the retrograde movement of the brush or abrasive could be checked at each advancement of 2 mils. To press the two series of pawls yieldingly against the two toothed strips there is a block of rubber 301 placed between the free ends of the pawls to keep them yieldingly pressed against the teeth. For the purpose of removing the pawl holder and pawls from the guide 291 there is the U-shaped pawl-releasing clip 302 raised or lowered by the thumb-screw 303 to which it is swivelly secured. As the vertical ends of the pawl-releasing clip engage the wedge edges of the vertical arms of the pawls the rubber block 301 is compressed, thus releasing the other ends of the pawls from engagement with the teeth.

In the operation of this modification with the positive feed attachment in action the pawl holder 293 is placed in the guide 291 and pushed down till the auxiliary finger 295 makes contact with the brush or abrasive 296 in the brush-holder box 292. The thumb-screw 303 is then backed off as far as possible to allow the pawls to engage the teeth. The brush-holder pressure finger 304 is then brought into action on the top of the auxiliary pressure finger to advance it against the brush or abrasive.

It is evident that even without the hardened teeth to engage the pawls a positive feed could be secured by reason of the sharp ends of the pawl or pawls digging into the soft sides of the guide 291.

It is evident too that the brush-holder box might be made to serve also as a guide as well, thus doing away with the second box or guide.

Figures 31 and 32 show how an attachment may be added to a common type of brush holder to convert the latter without mutilation into one with a delayed action pressure finger, the delayed action being caused by the slow escape of a fluid from one cylinder to another.

Attached to the front wall 311 of the brush-holder box 312 by the pigtail retaining screw 313 is the cylinder holder 314, the clamping ends 315 thereof, when set up by the screws 316, holding in accurate vertical alignment the cylinders 318 and 319 having a common plunger or piston 322 fitting closely but freely therein, the ends of said plunger having cupped leather packing 323 to make them water-tight. The outer ends of the two cylinders are plugged up, two enclosed spaces being thus formed, communication between which is through the pipe 324 having the controlling valve 325.

For positive advancement of the brush there is a loop around valve 325, said loop having a valve 325a, and a check valve 325b opening upward. Valve 325 is closed and valve 325a opened when positive advancement is desired; valve 325a remains closed at other times. Slightly opening valve 325a (valve 325 being closed) gives delayed positive advancement.

Clamped to the plunger 322 by the screws 328 is the twin member 329, with L-shaped sides 331, the vertical limbs of which terminate in feet 334 riveted to a brush-engaging cross-bar 366, on which presses the end of the brush-holder pressure finger 337.

Cylinders 318 and 319 and pipe 324 are filled with water or oil, using the funnel 338 and valve 339 at the last if desired, to get out all the air.

If the active member 342 is a pure abrasive a pasty substance 343 may be applied to the active member to decrease the chance of chattering such as a pasty mixture of clay and glycerine, or graphite and cylinder oil or vaseline.

In the operation of this modification, the active member is advanced by the member 329 attached to the plunger 322; the plunger 322 can move only by forcing out the liquid in cylinder 319 past the controlling valve 325 325; by nearly closing this valve the movement of the liquid and, consequently of the plunger 322 the member 329 and the active member 342 may be made as slow as desired.

In Figures 31 and 32, as shown, it is evident that the active member is prevented from moving backward quickly, and that the pressure finger (and therefore the active member) is prevented from moving forward quickly. If, moreover, the cross-bar 334 comes under the main part of the pressure finger instead of under the end that is designed to engage the brush or active member, then the brush or active member may move backward quickly, while the pressure finger (and therefore the brush or active member) is prevented from moving forward quickly. One form of such an arrangement is shown in the alternative construction of Figure 33, where the pressure finger end projects through an opening in the cross-bar to engage the brush or active member.

The modification shown in Figures 34, 35 and 36 is meant to grind out the ridges as well as the flat spots of the commutator. A guide or pair of ways 351 is clamped to the front walls of a row of brush-holder boxes 352 by the two U-shaped clamps 353, 353, the rear branch of each being divided into two limbs 355 in order to span the brush-holder pressure finger 356 and brush-holder shank 357. Slidably mounted on the pair of ways is the slide 358 in which is secured by the set-screw 359 the abrasive block 360. A piece of fibre 361 interposed between the set-screw 359 and the abrasive block 360 is to prevent the latter from being broken by the points of the set-screws. The clamps 353 are set up by the cap-screws 362 which are threaded into the outer branches 363 of the clamps and secured thereto by the jam-nuts 364. These cap-screws are not threaded into the side of the pair of ways but slidably enter unthreaded blind body-size holes therein. The pair of ways 351 is set slightly out of parallelism with the axis of the commutator 365 but in the same plane, the outer end of the pair of ways being slightly nearer the commutator than the inner end. The slide 358 to which is secured the abrasive block is drawn across the commutator by the cord 366 running over the pulley 367 to the weight 368. The pulley is mounted on a bushing 369, between which and the bore of the pulley is a coating of asphalt 370, said asphalt being set to functioning, if desired by setting up the screw 371 against the rod 372 which is secured by the cap-bolt 373 to the bearing of the electric machine. Several turns of the cord 366 are taken around the pulley when the asphalt is in use to hinder the motion of the pulley; this is for the purpose of avoiding the possibility of the slipping of the cord, further security being attained by the use of screw 374 to clamp a turn of the cord to the pulley 367. The ridges in the commutator that it is desired to grind are seen at 375. Clamp 376 across the ways 351 and adjustable thereon by the cap-screw 377 is used to limit the axial travel of the abrasive.

Preliminary to the use of this modification to grind out the ridges in the commutator, the inner end of the commutator may be ground true in the way described in the forms of the invention previously described. If the length of the abrasive is the same as the width of a brush, the initial position of the abrasive block will register with the inner portion of the commutator already trued up. By adjustment of the clamps 353 the abrasive 360 is brought into contact with the trued up part of the commutator, this adjustment being relied upon to give at the same time a slight inclination to the ways or guide 351. Final adjustment of the abrasive to give complete linear contact with the commutator is made with the set-screws 359. The weight 368 is then put into action to draw the abrasive across the commutator. The heavier the weight the faster the abrasive is drawn across the commutator. The time of traversing the length of the commutator may vary from several hours to several days. The slower the travel of the abrasive block the more efficiently it is used. If an abrasive block wider than the width of a brush is used one or more notches may be ground in it to avoid interference from the ridges and bring it snugly up against the commutator in its initial setting.

The inclination of the pair of ways is so small that all axial advancement made by the abrasive is held; consequently when the high parts of the commutator come under the abrasive the brush holders will have to yield a little. Generally the depth of the flat spot is so small that the abrasive can make only a small axial advancement when the flat spot of the commutator comes under the abrasive; the resultant yielding of the brush holders when the high spots come under the abrasive is generally well within the elastic limit of the brush holders and their supporting structure. There might, however, be a flat spot so deep that an axial advance of the abrasive block unhindered by the asphalt on the bore of the pulley 367 would necessitate a subsequent yielding of the brush holders beyond their elastic limit, when the succeeding high parts of the commutator came under the abrasive. In this case the brush holders might slip on their studs or be broken. If the brush holders are strong and well secured the abrasive would probably be sheared off. It is to avoid the possibility of a sudden large axial advance of the abrasive, as in the case of a deep flat spot, that the asphalt hindering means is provided. Generally the flat spot on the commutator is not likely to be very deep, so, in certain cases, there may be no need to use the asphalt hindering means on the bore of pulley 367.

In the forms of my invention above described, the friction which retards the motion of the brush or abrasive member varies more or less with the stress on the spring actuating the pressure finger. In the form of my invention shown in Figure 37 this friction is independent of the stress of the pressure finger spring. In this form of invention I provide a pusher member 390 interposed between the brush and the pressure finger. The two halves or sections 391 and 392 of the pusher member are kept loosely assembled by a screw or rivet 394, an oversize hole 395 in the section 392 permitting relative movement between the sections. Mounted in a blind hole in the section 391 is a spiral spring 396 which projects into a registering threaded hole 397 in the section 392 and is subject to adjustable compression so as to control the friction by means of a short screw 398 threaded into the hole 397.

When my improved brush holder is used with an abrasive brush for truing commutators, the brush employed should contain enough abrasive to produce a truing effect sufficient to more than offset the tendency of sparking between the brush and commutator to cause the commutator to become out of round. The abrasive content may range from 10% to 70% although in certain cases I may employ less than 10%. I find that a brush containing 25% abrasive and 75% carbon or similar conducting material produce very satisfactory results. By abrasive I mean a material which has a substantial abrasive action on the copper commutator bars, has, for example, carborundum, corundum, or emery.

Other forms of the generic invention herein disclosed are described in my co-pending applications Ser. Nos. 278,748, 278,749, and 278,751 and 278,752, all of even date herewith, and my Patent #1,727,112, dated Sept. 3, 1929. Said application Ser. No. 278,749 contains claims broadly to the idea of causing the brush to exert greater pressure on high parts of the commutator than on low parts, particularly for the purpose of truing the commutator.

I claim:

1. In a device for truing a commutator having high and low parts, the combination, with an abrasive member having an abrasiveness in excess of that of a brush composed of 90 per cent. brush carbon and 10 per cent. carborundum; and brush holder for supporting said member, of spring pressed movable means in engagement with said member for advancing said member toward the commutator and additional means for causing said member to be pressed with substantially greater pressure against high parts of the commutator than against low parts, whereby there is substantially greater abrasive effect on the high parts than on the low parts, said additional means engaging said first named means for resisting all retrograde motion of said member and first named means.

2. The combination, with an abrasive member and a brush holder for supporting said member, of spring pressed movable means in engagement with said member for advancing it toward the commutator and additional means engaging said first named means for frictionally resisting all retrograde motion thereof.

3. The combination, with an abrasive member and a brush holder for supporting said member, of movable means in engagement with said member for advancing it toward the commutator and viscous means for retarding the motion of said member.

4. The combination, with an abrasive member and a brush holder for supporting said member, of movable means in engagement with said member for advancing it toward the commutator and fluid means for retarding the motion of said member.

5. The combination, with a brush holder and an abrasive brush carried thereby, of movable means in contact with said brush for advancing it toward the commutator, viscous means for retarding the motion of said brush and means for varying the hindering effect of said viscous means.

6. In a device of the class described, a brush holder comprising brush advancing means and means for hindering the motion of said advancing means, said last named means comprising a rotary member, a stationary member adapted to be engaged by said rotary member to resist continued rotation and a connection between said rotary member and said brush advancing means.

7. A brush holder for electric machines, comprising brush and directing means, means for attaching the brush directing means to some stationary part of the machine, a spring actuated pressure finger and friction means for hindering the motion of the pressure finger, said friction hindering means increasing in hindering effect as the stress of the spring actuating the pressure finger is increased and decreasing in hindering effect as the stress of the spring is decreased.

8. A brush holder having a spring pressed pressure finger, an auxiliary spring mounted on the pressure finger and adapted to contact with the brush and designed to permit retrograde movement of the brush independently of the pressure finger and adjustable means for limiting the retrograde movement relative to the pressure finger.

9. A brush holder having a spring pressed pressure finger, an auxiliary spring mounted on the pressure finger and adapted to contact with the brush and designed to permit retrograde movement of the brush independently of the pressure finger, adjustable means for limiting the retrograde movement relative to the pressure finger and means for varying the effective stiffness of the auxiliary spring.

10. A brush holder for electrical machines, comprising a brush-holder body having a brush box, an inflexible pressure finger mounted on said body and extending over the brush box, and automatic non-reversible means for advancing said pressure finger towards the said brush box.

11. In a dynamo electric machine having stationary supporting means, a brush holder supported by said means and comprising a body having a brush guide and an inflexible pressure finger extending over said guide and formed with a rigid pressure end and means for automatically advancing the pressure finger, substantially non-reversibly with respect to said supporting means.

12. The combination with an abrasive brush, of a brush holder having a brush guide, a pressure member engaging said brush, a spring engaging said member for advancing said member and brush, and a locking connection between one of the parts so advanced and a stationary part of the brush holder, said connection resisting through substantial structural rigidity all retrograde movement of said brush and said connection embodying means which permit said advancement.

13. The combination with an abrasive brush, of a brush holder having a brush guide, a pressure member engaging said brush, a spring engaging said member for advancing said member and brush, and a locking connection between one of the parts so advanced and a stationary part of the brush holder, said connection resisting through substantial structural rigidity all retrograde movement of said brush and said connection embodying means which permit said advancement and means for retarding said advancement.

14. The combination with an abrasive brush, of a brush holder having a brush guide, a pressure member engaging said brush, a spring engaging said member for advancing said member and brush, and a locking connection between one of the parts so advanced and a stationary part of the brush holder, said connection resisting through substantial structural rigidity all retrograde movement of said brush, said connection embodying means which permit said advancement and viscous means for retarding said advancement.

15. A brush holder for electrical machines, comprising a brush-holder body having a brush box, a pressure finger mounted on said brush-holder body and extending over the brush box, automatic means for advancing the pressure finger towards the brush box, and delayed action hindering means for retarding the movement of the pressure finger.

16. A brush holder having a brush box, an abrasive member mounted therein, a pressure finger extending over said brush box, and in engagement with said abrasive member, means for automatically advancing said pressure finger, and delayed action hindering means for retarding the movement of said pressure finger.

17. A brush holder for electrical machines, comprising a brush-holder body having a brush box, a pressure finger with the bush-engaging part thereof extending over the brush box, means for automatically advancing the pressure finger towards the brush box, relief means that acts quickly when a predetermined reaction thrust on the brush-engaging part of the pressure finger has been exceeded, and delayed action hindering means for retarding the movement of the pressure finger.

18. In a dynamo electric machine having a stationary supporting means, a brush holder carried by said means and comprising a brush guide, a member directed by said guide, said member having an abrasive action substantially greater than a brush composed of 95% brush carbon and 5% carborundum means for automatically advancing said member along said guide and frictional means engaging said last named means for substantially hindering all movement thereof.

19. In a dynamo electric machine having a stationary supporting means, a brush holder carried by said means and comprising a brush box, a member slidable in said brush box, said member having an abrasive action substantially greater than a brush composed of 95% brush carbon and 5% carborundum, a pressure finger for advancing said member and means in substantial frictional engagement with said pressure finger for hindering all movement thereof.

20. In a dynamo electric machine having a stationary supporting means, a brush holder carried by said means and comprising a brush guide, a member movable in said guide, means for advancing said member along said guide, and a snubbing device for resisting movement of said member, said snubbing device comprising a flexible member connected to said first named member and a relatively stationary part around which said flexible member is wrapped so as to be in binding engagement therewith.

21. In a device for truing a commutator having high and low parts, the combination with a member having approximately the abrasiveness of a consolidated body composed of 75 per cent brush carbon and 25 per cent carborundum, and a brush holder for supporting said member, of spring pressed movable means in engagement with said member for advancing said member toward the commutator and additional means for causing said member to be pressed with substantially greater pressure against high parts of the commutator than against low parts, whereby there is substantially greater abrasive effect on the high parts than on the low parts, said additional means engaging said first named means for resisting all retrograde motion of said member and first named means.

22. In a brush holder device for truing commutators having high and low parts, a brush holder, and slidably mounted thereon an abrasive member, means for advancing said member into cooperative engagement with said commutator and delayed action hindering means for hindering movement of said abrasive advancing means and thereby hindering movement of said member and causing said member to press against the high parts of the commutator with greater pressure than against low parts.

23. In a brush holder device for truing commutators having high and low parts, a brush holder having a brush box and slidably mounted on the outside of said brush box, an abrasive member, means for advancing said member into cooperative engagement with said commutator and means for hindering movement of said abrasive advancing means and thereby hindering movement of said member and thereby causing said member to press against the high parts of the commutator with greater pressure than against the low parts.

24. A brush holder for electric machines having a brush box, a spring-actuated pressure finger and means independent of brush box friction for hindering with substantial friction all to-and-fro movement of the pressure finger.

Signed at New York in the county of New York and State of New York this 17th day of May A. D. 1928.

HORACE D. MUNDAY.